Aug. 7, 1945. J. C. COX 2,381,114
SAFETY CLIMBING DEVICE
Filed July 27, 1944
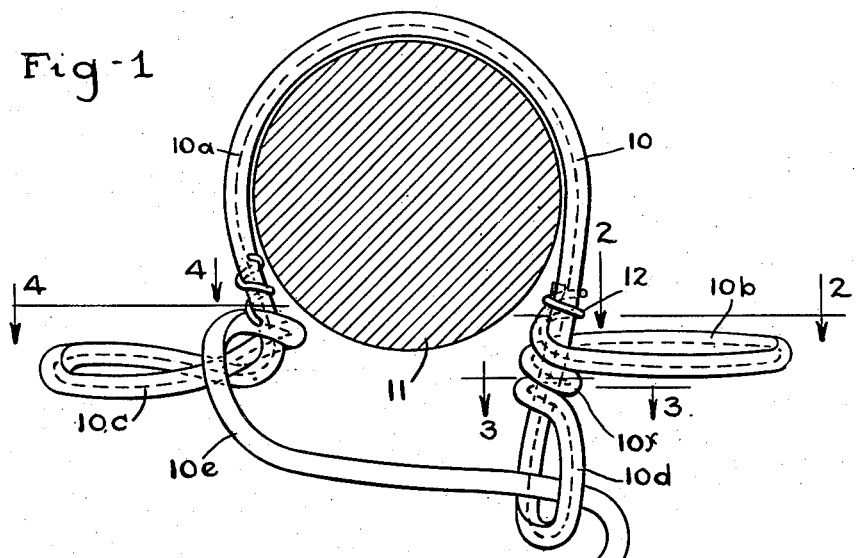
Fig-1
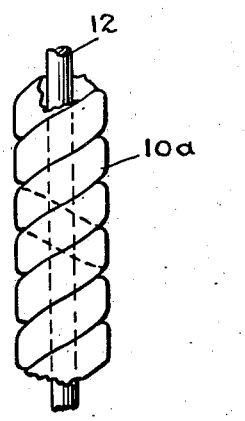
Fig-5
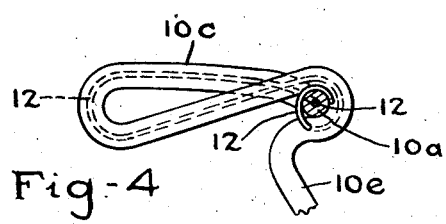
Fig-4
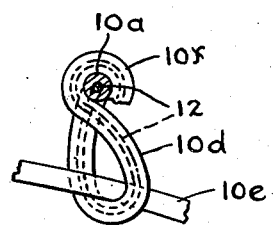
Fig-3
Fig-2
Inventor:
JESSE C. COX
By Chas. E. Reif
Attorney.

Patented Aug. 7, 1945

2,381,114

UNITED STATES PATENT OFFICE 2,381,114

SAFETY CLIMBING DEVICE

Jesse C. Cox, Robbinsdale, Minn.

Application July 27, 1944, Serial No. 546,863

8 Claims. (Cl. 227—24)

This invention relates to a safety climbing device adapted to be used by line men and other persons climbing poles or trees.

Line men and other persons doing climbing now commonly use spikes or cleats attached to their shoes which they insert or sink into the pole or tree as the same is ascended, the climber reaching around the tree with his arms as he ascends. The climber must depend largely upon the support of said spikes or cleats and if these should slip or tear out of the pole or tree he is apt to sustain a fall. Many line men and other climbers have been seriously injured in this manner and quite a number of such persons have been killed.

It is an object of this invention to provide a device which can be used by the climber in his ascent of the pole or tree which is so constructed that should the spikes or cleats of the climber slip or tear out of the pole or tree he will be prevented from falling.

It is a further object of the invention to provide a safety climbing device comprising a member adapted to extend around one side of the tree to adjacent the other side, said member having hand grips secured adjacent its ends and having a strand of flexible material attached to the body of the climber and constructed and arranged to tighten the device about the pole or tree should the climber start to fall.

It is another object of the invention to provide a device comprising a strand of stiff flexible material having a substantially semi-circular portion or bight adapted to extend about the pole or tree, said portion having hand grips adjacent its ends, an apertured member or loop adjacent one of said ends and a strand of flexible material secured adjacent the other of said ends and movable freely through said apertured member or loop and provided with means to be attached to a belt worn by the operator.

It is more specifically an object of the invention to provide a safety climbing device comprising a strand of rope-like material having a friction surface and being made stiff as by having a stiff wire disposed therein, said strand having a substantially semi-circular portion adapted to extend about the pole or tree and being formed into outwardly extending loops at each end of said portion, said strand also being formed into a third loop adjacent one end of said portion and having a freely flexible end portion extending from adjacent the other end and movable freely through said third loop, said strand having means adjacent its ends such as a snap hook adapted to be attached to a belt worn by the operator and also preferably having means thereon for easily varying the length thereof.

These and other objects and advantages of the invention will be fully set forth in the following description made in connection with the accompanying drawing in which like reference characters refer to similar parts throughout the several views and in which—

Fig. 1 is a view in horizontal plan of the device, the same being shown as extending about a pole illustrated in horizontal cross section;

Fig. 2 is a substantially horizontal section taken substantially on line 2—2 of Fig. 1;

Fig. 3 is a substantially horizontal section taken substantially on line 3—3 of Fig. 1;

Fig. 4 is a substantially horizontal section taken on line 4—4 of Fig. 1, said sections being taken as indicated by the arrows; and Fig. 5 is a view in side elevation of a portion of the rope used, the same being shown on an enlarged scale.

Referring to the drawing a safety climbing device is shown comprising a member 10 which will be made of flexible but rather stiff material. While various materials could be used, in one practical embodiment of the invention member 10 is made of a strand of comparatively heavy rope. Member 10 is formed intermediate its ends into a substantially semi-circular portion or bight 10a. Portion 10a is adapted to extend about one side of a pole or tree 11. At one end of portion 10a a hand grip member 10b is formed and at the other end of portion 10a a hand grip member 10c is provided. While members 10b and 10c could be variously constructed and secured to portion 10a, in the embodiment of the invention illustrated, the rope 10 is bent to form loops 10b and 10c. An apertured member or third loop 10d is provided adjacent loop 10b and a strand of flexible material 10e is provided extending from adjacent the hand grip 10c and passed through the apertured member or loop 10d, said strand being freely movable through member 10d. While the apertured portion or loop 10d and strand 10e could be variously formed and attached, in the embodiment of the invention illustrated they are formed as integral portions of the rope used to form member 10. As shown in Fig. 1, the side of portion 10a at the right of Fig. 1 extends outwardly from pole 11 and the loop 10d is formed therein. The rope is then coiled about said end of portion 10a as shown at 10f and said rope then extends outwardly to form loop 10b. The end of the rope is carried along the side of portion 10a at the right of Fig. 1. Portion 10a at the left hand side of Fig. 1 is continued downwardly and outwardly to form the loop 10c as shown in said figure and is then continued to form the strand 10e. In order to get the desired stiffness into the portion 10a a stiff wire 12 is provided. One end of this wire is shown at the right of Fig. 1 as coiled about portion 10a adjacent one end thereof and holds the terminal end of the rope in position. After being coiled about portion 10a and said end said wire enters the rope and extends substantially axially thereof around loop 10b and around portion 10a and into and around loop 10c. The wire 12 emerges from the rope as shown at the left hand side of Fig. 1 adjacent the inner end of loop 10c and at the attached end of the strand 10e. Said wire is coiled about portion 10a at the left hand side thereof as shown in Fig. 1. The wire 12 as stated, gives the desired stiffness to the portion 10a and yet allows the desired flexibility in said portion. The strand 10e is reversely bent adjacent its terminal end and is formed with a loop 10f. A metallic member 13 of slightly curved form intermediate its ends has rings or loops 13a at each end through which strand 10e passes. The reversely bent portion of strand 10e forms a loop 10h in which is received the ring 14a pivotally connected to and forming part of a snap hook 14 adapted to be readily attached and detached from a ring 15 which will be secured to a belt 16 worn by the climber or operator. The movable jaw of snap hook 14 is shown as 14b.

In operation when the climber is to climb a pole the device will be placed in position with the semi-circular loop or bight 10a extending about the pole as shown in Fig. 1. Strand 10e will then be passed through the loop 10d and the snap hook 14 will be attached to the belt worn by the climber as described. The member 13 can be moved along the strand 10e to vary the length of said strand. Said member 13 tightly grips the strand 10e by its ring 13a. The operator now grasps the loops 10b and 10c with his hands respectively and holds the portion 10a against the opposite side of the pole as he inserts his spikes into the pole. As he moves up the pole he moves the device and portion 10a along the pole with each step or two. The pole is thus embraced by the portion 10a instead of by the arms of the operator as is the usual custom. Should the climber's spikes tear out of the pole or tree and should he start to fall, his weight will be transmitted to the strand 10e and this will pull through the loop 10d so that the portion 10a will be pulled tight about the pole 11. The fall of the climber will thus be stopped and he can readily again insert his spikes into the pole and resume his climb.

It will be seen that the more force placed upon the end of strand 10e the tighter will the portion 10a be drawn about the tree or pole. It is easier for the operator to hold the hand grip members or loops 10b and 10c and successively move portion 10a upwardly than it is for him to embrace the pole with his hands and arms. The climber is relieved of contacting the often rough and splintery pole or tree with his hands.

From the above description it will be seen that I have provided a comparatively simple and yet highly efficient safety device for climbers. The danger of a serious fall which has always existed is eliminated and the climbing operation is made easier. A line-man commonly wears a heavy belt in which various tools are carried. The snap hook 14 can readily be connected to said belt as by a ring 15 and the climber is then ready for the climbing operation. One form of the invention illustrated is easily and conveniently made from one strand of rope together with the wire 12. The rope has a good friction surface and grips the pole or tree in a very desirable manner. The device has been amply demonstrated in actual practice and found to be very successful and efficient.

It will of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A safety climbing device having in combination, an elongated member of stiff but flexible material, the same being formed into a bight adapted to extend partially around a pole or tree trunk and have its ends disposed at one side thereof, a hand grip member at each end of said bight, a strand of flexible material secured adjacent one end of said bight and an apertured member secured at the other end of said bight through which said strand passes and in which it is freely movable and means at the end of said strand adapted for attachment to a belt or other article fastened to the operator.

2. A safety climbing device comprising an elongated member of stiff but bendable material, the same being formed into substantially semi-circular portion, a loop at each end of said portion forming hand grips respectively, a third loop adjacent one end of said portion, a strand of flexible material extending from adjacent the end of said portion opposite said third loop and passing freely through said third loop and means at the end of said strand adapted to be attached to a belt or other article fastened to the operator.

3. A safety climbing device comprising a strand of flexible material formed between its ends into a substantially semi-circular portion, said strand being formed into an outwardly extending loop at each end of said semi-circular portion, said loops constituting hand grips, said strand beyond one of said loops being formed into a third loop, one end portion of said strand extending from the one of said first mentioned loops at the end of said semi-circular portion opposite said third loop and passing freely through said third loop and means adjacent the end of said end portion adapted to be attached to the operator.

4. A safety climbing device comprising a strand of rope, said rope comprising an intermediate bight portion adapted to embrace a tree trunk or pole and have its ends disposed at one side thereof and being formed into loops at each end of said portion, a stiff bendable wire extending through said bight portion and loops, one end portion of said strand extending beyond one of said loops and wire and being formed into a third loop, said strand extending from adjacent the other of said first mentioned loops and passing freely through said third loop and means at the end of said end portion adapted for attachment to a belt or other article worn by the operator.

5. A safety climbing device having in combination, an elongated member of flexible stiff, rope-like material having a friction surface, said member being formed intermediate its ends into a bight adapted to extend around a portion of a pole or tree trunk and have its ends disposed at one side thereof, hand grip members at the ends of said bight, a strand of flexible material extending from adjacent one of said hand grip members and a loop formed adjacent the other of said hand grip members through which said strand freely passes and in which it is freely movable, means adjacent the end of said strand for attachment to an article fastened to the operator and means for varying the length of said strand.

6. A safety climbing device comprising a unitary strand of rope, said strand being formed intermediate its ends into a bight adapted to extend around a portion of a pole or tree trunk, said strand at the ends of said bight being formed into outwardly extending loops constituting hand grips, a stiff flexible wire coiled about said strand adjacent one of said loops, said wire entering said strand and passing around said loops and said bight and passing out of said strand adjacent the inner end of said other loop and coiled about said strand, said strand being formed into a third loop adjacent one of said first mentioned loops and also having an end portion extending from the other of said first mentioned loops and passing freely through said third loop and means at the end of said end portion adapted to be attached to an article worn by or fastened to the operator.

7. A safety climbing device having in combination, an elongated member of flexible material, the same being formed intermediate its ends into a curved bight adapted to extend partially around a pole or tree trunk and have its ends disposed at one side thereof, an apertured member adjacent one end of said bight and a strand of flexible material secured adjacent the other end of said bight and passing through and freely movable through said apertured member, the end portion of said strand opposite said bight being adapted for attachment to the operator whereby should said operator fall said strand will move through said apertured member and tighten said bight about said pole or tree trunk thus stopping the operator's fall.

8. A safety climbing device having in combination, an elongated member of rope-like material, the same being formed into a bight adapted to extend partially around a pole or tree trunk and have its ends disposed at one side thereof, said member having portions at the ends of said bight adapted to be grasped by the operator for manipulating said bight, a strand of flexible material secured adjacent one end of said bight and a loop at the other end of said bight through which said strand passes and in which it is freely movable and means at the end of said strand adapted for attachment to a belt or other article fastened to the operator.

JESSE C. COX.